United States Patent [19]
Morse et al.

[11] 3,788,174
[45] Jan. 29, 1974

[54] MACHINE FOR TRIMMING THE EDGES OF PANELS

[75] Inventors: Donald B. Morse; Bernard A. Pribish, both of Joliet, Ill.

[73] Assignee: Kemlite Corporation, Joliet, Ill.

[22] Filed: Dec. 15, 1972

[21] Appl. No.: 315,494

Related U.S. Application Data
[62] Division of Ser. No. 99,135, Dec. 17, 1970.

[52] U.S. Cl. .......................... 83/79, 83/358, 83/360, 83/404.2, 83/408, 83/415, 83/422, 83/425.2, 83/461
[51] Int. Cl. .......................... B26d 1/12, B27b 5/04
[58] Field of Search .. 83/409, 415, 422, 425.2, 517, 83/404.1, 404.2, 407, 408, 425.3, 435.1, 79, 358, 360, 461

[56] References Cited
UNITED STATES PATENTS

| | | | |
|---|---|---|---|
| 1,863,303 | 6/1932 | Good | 83/425.2 X |
| 2,759,504 | 8/1956 | Stooks | 83/404.2 X |
| 3,388,727 | 6/1968 | Kotila | 83/409 |
| 3,286,744 | 11/1966 | Stall et al. | 83/409 |
| 3,138,179 | 6/1964 | Brettrager | 83/415 |
| 3,538,963 | 11/1970 | Adams | 83/415 |
| 1,329,634 | 2/1920 | Schumacher et al. | 83/425.2 X |
| 1,700,400 | 1/1929 | Carlson et al. | 83/425.2 X |
| 2,022,799 | 12/1935 | Blosser et al. | 83/415 X |

*Primary Examiner*—Frank T. Yost
*Attorney, Agent, or Firm*—Carl C. Batz

[57] ABSTRACT

A machine for trimming the edges of panels wherein a first conveyor mechanism passes the panels past a pair of saws for trimming the side edges of the panels and a second conveyor mechanism passes the panels past a second pair of saws for trimming the end edges of the panels. The machine has transfer mechanism for transferring the panels from the first conveyor system to the second conveyor system. The machine includes a device for severing the web between the panels as they pass through the machine, and includes also a device for turning the panels over when they have been trimmed.

10 Claims, 32 Drawing Figures

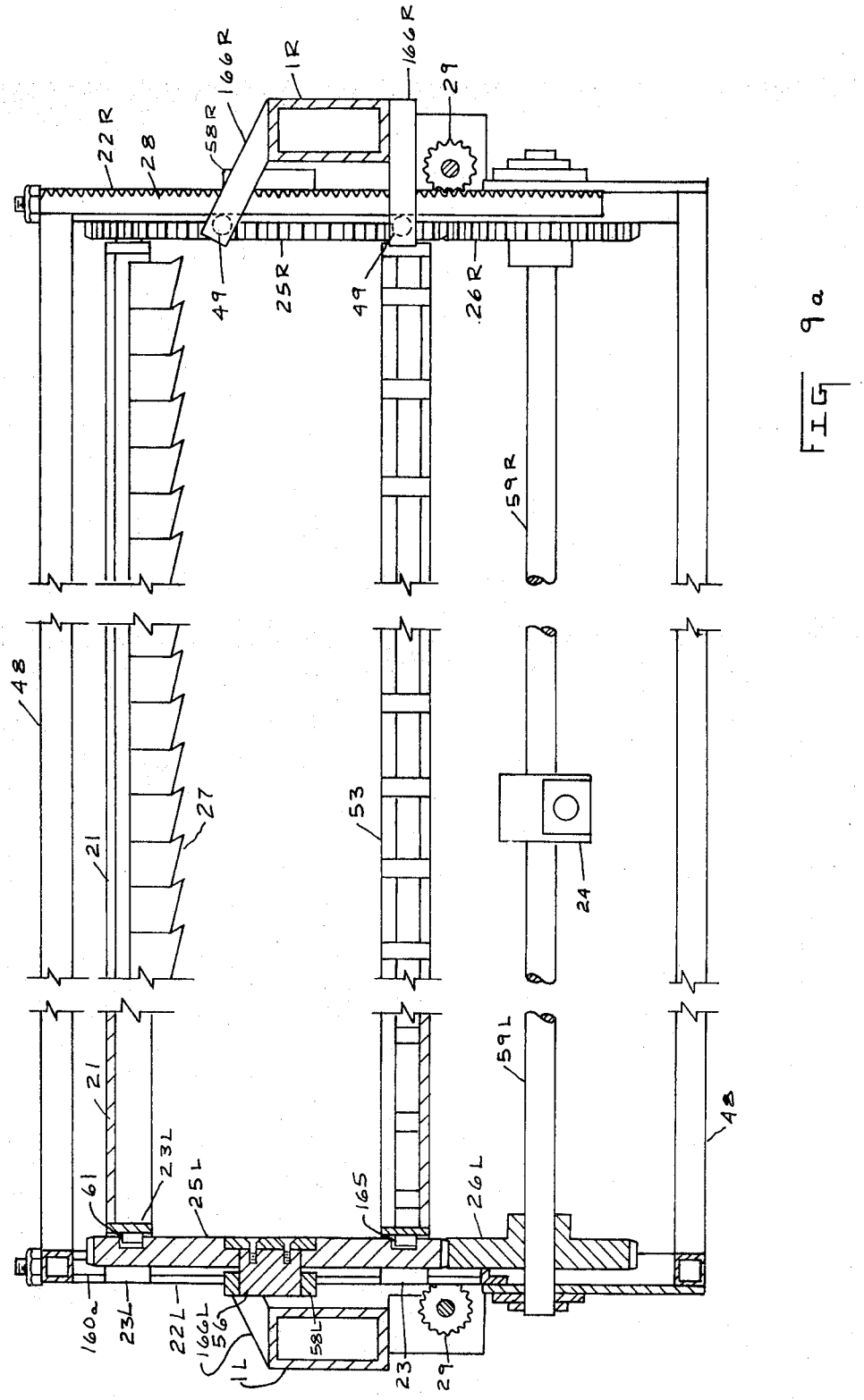

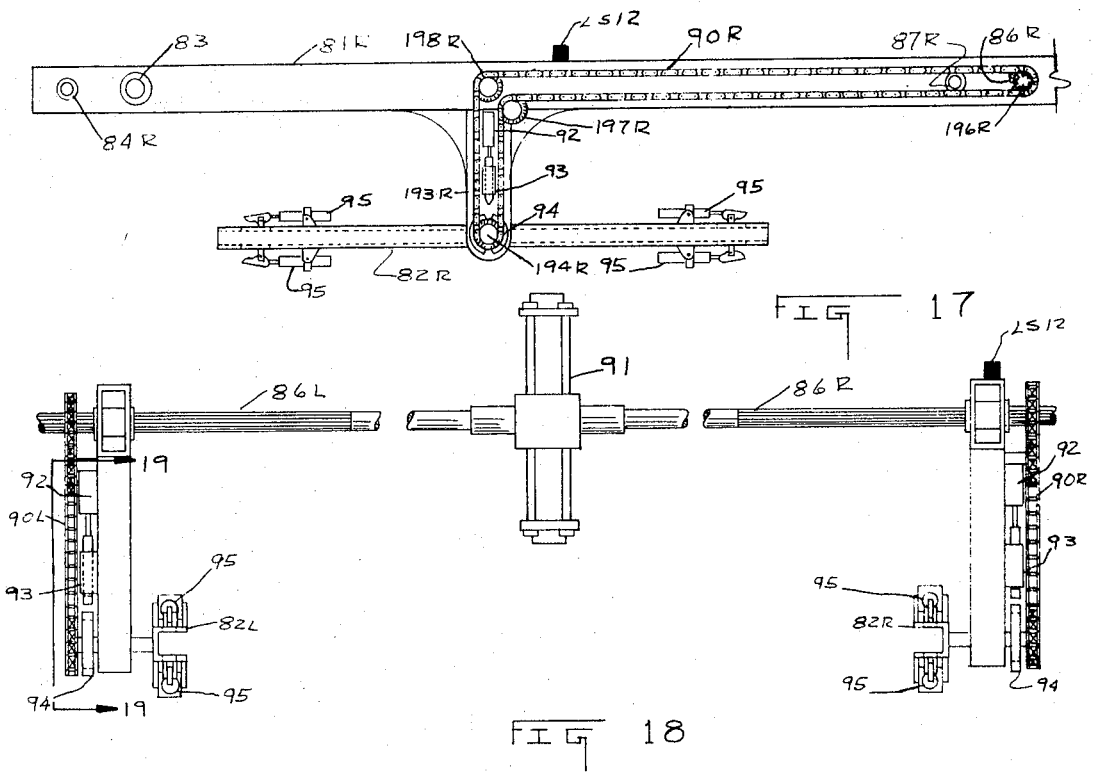
FIG 17
FIG 18
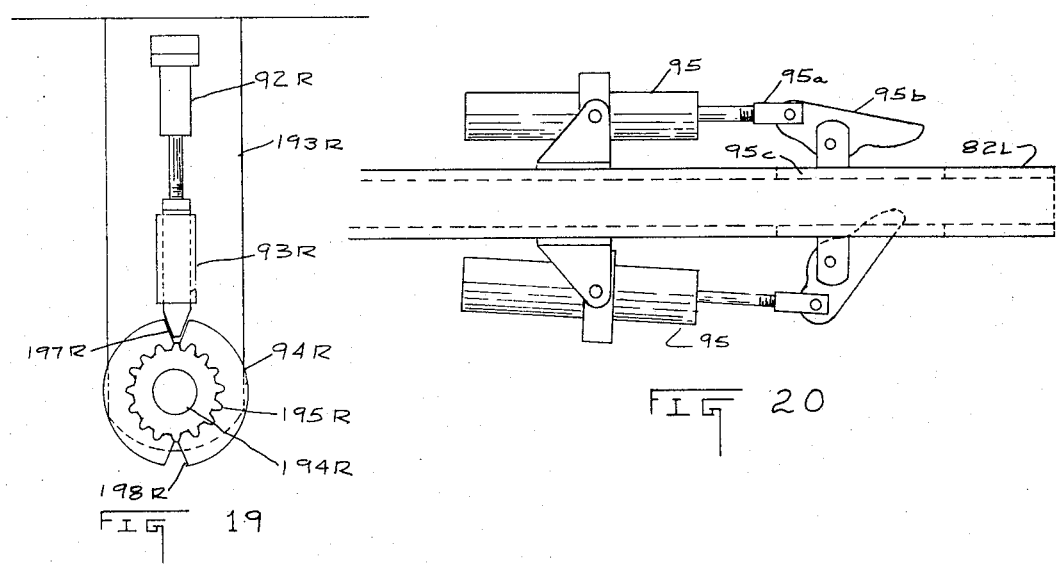
FIG 19
FIG 20

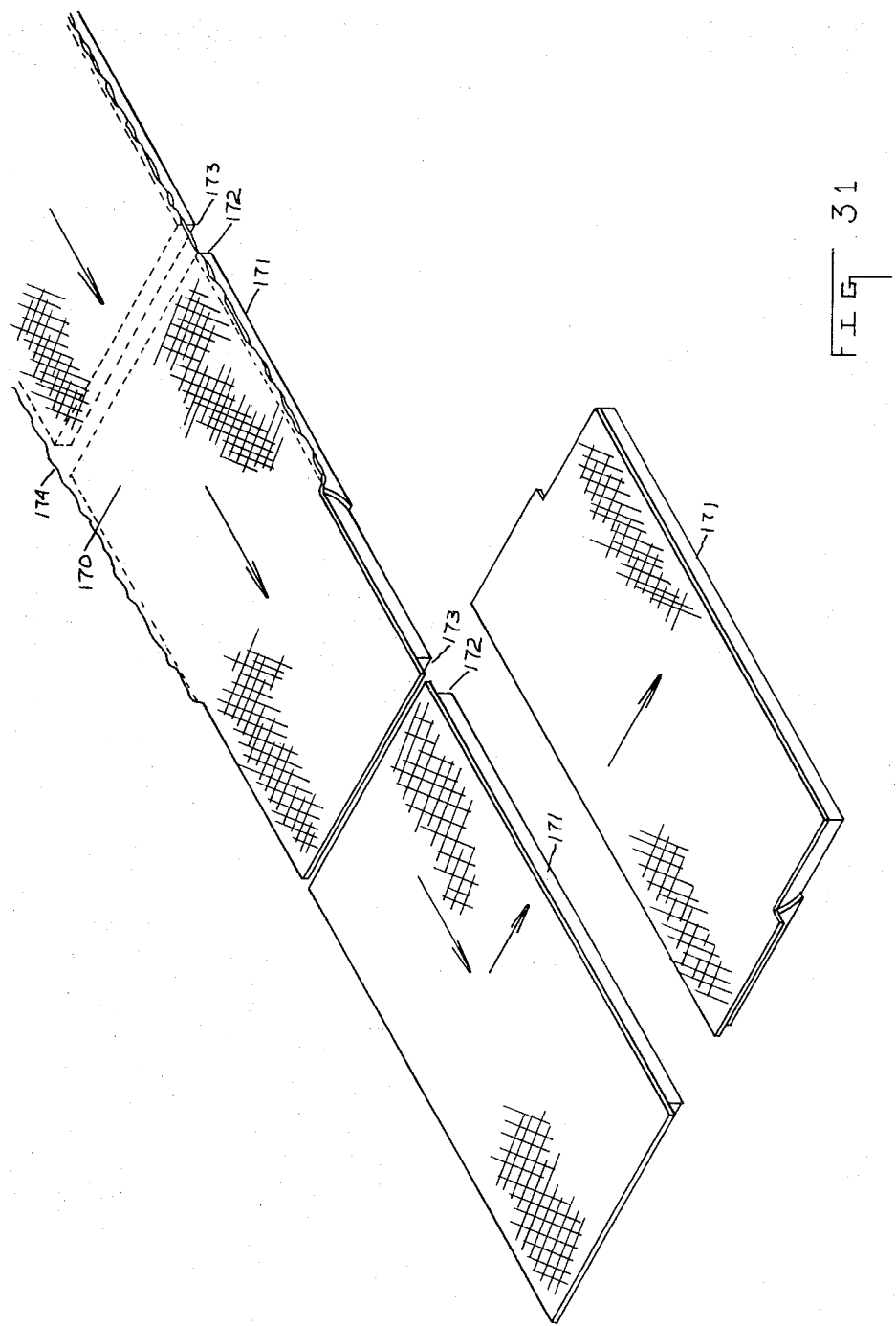

MACHINE FOR TRIMMING THE EDGES OF PANELS

This application is a division of copending application Ser. No. 99,135, filed Dec. 17, 1970, entitled "Machine for Trimming the Edges of Panels."

SUMMARY

This invention relates to a machine for trimming the edges of panels. More particularly, the invention relates to a machine which will receive panels such as the common 4 by 6 foot plywood panels, continuously, as they come from a forming machine, and trim and square the panels automatically.

The machine is especially adapted for the treatment of panels of plywood or the like which come from the forming machine with their top surfaces coated with a continuous film of material such as a resin-impregnated fiberglass. The machine may be utilized for the trimming of panels of many different types, sizes and materials, but for the purposes of detailed description given herein we will describe the machine as it is applied to panels having a continuous coating of resin-impregnated fiberglass.

BACKGROUND

A most common form of building material is the panel, such as the well known plywood panels which come in many convenient sizes, thicknesses and finishes. One of the problems in the preparation of the panels is to get the edges cut straight and square so that the panels can be used where tolerances are not great and to eliminate hand work when the panels are put in place. It is further desirable to accomplish this automatically at a more rapid rate and without hand labor or human attention.

Machines have heretofore been devised for forming the panels and delivering them continuously, but the edges need trimming, and squaring needs to be done to make the edges true and accurately aligned.

We refer particularly to Menzer U.S. Pat. No. 3,377,228 which describes the formation of a structural panel wherein a fiberglass mat is impregnated with resin in a continuous manner providing a top layer which is placed on the top surfaces of plywood panels which follow one after the other on a conveyor. The composite panels, with the continuous sheet as a top layer are passed through a heating zone where the resin is cured, and the panels are delivered for further finishing.

In the prior practice such further finishing has required skilled hand labor. The resin coating had to be trimmed all about the edges of the panel, and this was slowly and laboriously done by a skilled operator using a knife. In order to have the coating extend to the side edge of the panel it was necessary that the coating extend over the edge somewhat, and this had to be trimmed off as well as to sever the web between the panels. In this trimming operation one slip of the knife many times meant that the panel was ruined. Such hand trimming not only was slow and required a great amount of skill but was a very unpleasant task, and it became very difficult indeed to get men who could and would perform the operation.

By this invention we provide a machine which will perform the necessary functions automatically and which will do the job far more accurately than it possibly could be done by hand and at a much greater rate.

THE DRAWINGS

One embodiment of the invention is set forth in the accompanying drawings in which FIG. 1 is a top or plan view of the machine;

FIG. 9a is a detail view in front elevation showing the break-up mechanism, the view being partly in section;

FIG. 17 is a view in elevation of the flipper mechanism taken as seen from line 17—17 of FIG. 1;

FIG. 18 is a front view in elevation of the flipper mechanism;

FIG. 19 is a side elevational view of the cam lock of the flipper mechanism, the view being taken as seen from the line 19—19 of FIG. 18;

FIG. 20 is a detail view in side elevation of the grippers shown in FIG. 17;

FIG. 31 is a perspective view of the untrimmed panels joined by the resin-impregnated fiberglass web, as they come from the forming machine and are fed to our trimming machine.

GENERAL DESCRIPTION

Figure 1:
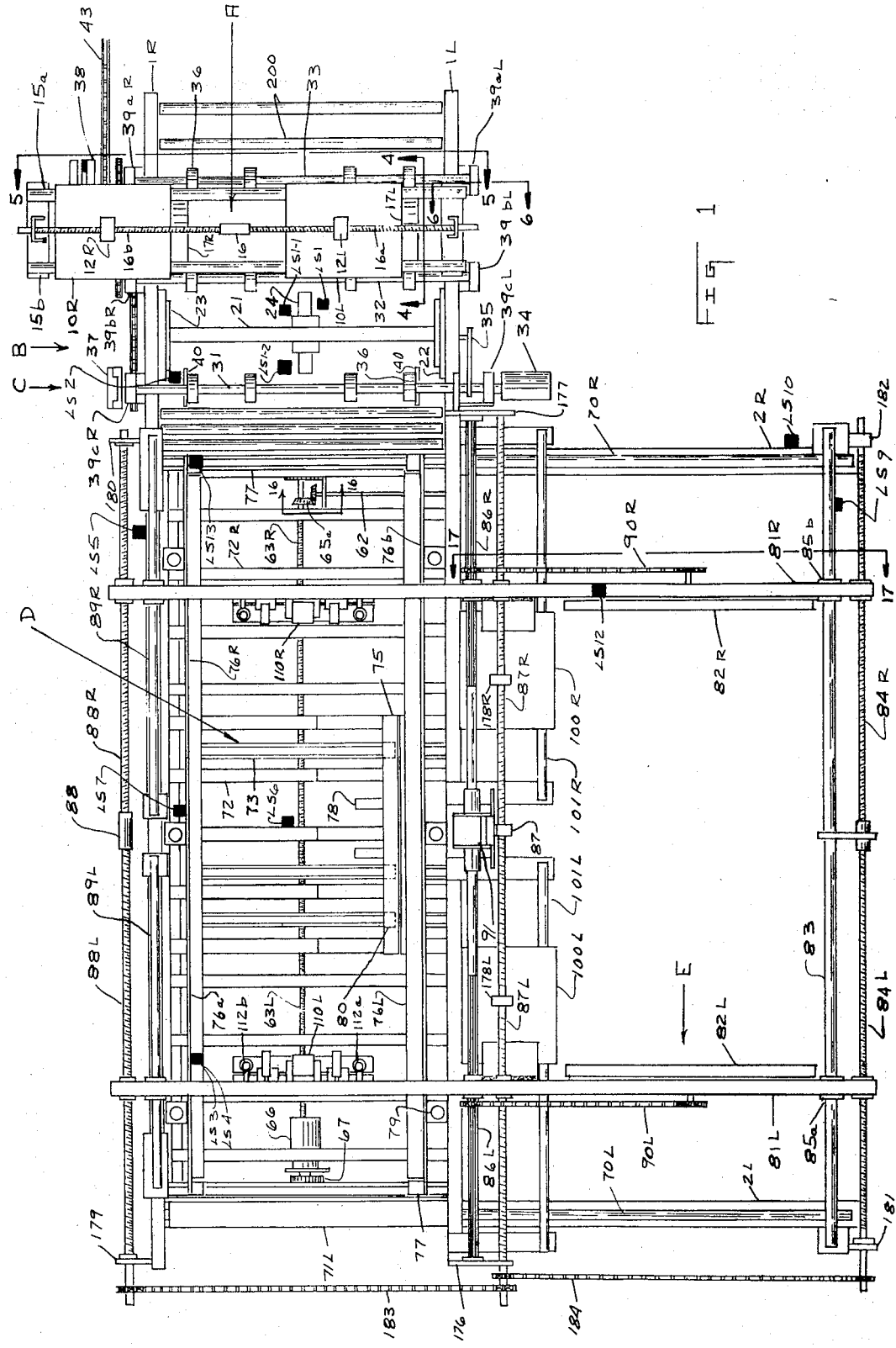

We have now devised a mechine which will automatically saw and square the edges of the panels to be finished, and which in the case of the plywood panels having the top layer of fiberglass-resin, will automatically sever the continuous top layer between the panels.

For convenience of description we will treat the machine as being composed of its principal parts according to their functions. The first sawing mechanism A operates to trim the sides of the panel; then the break-up mechanism B operates to sever the web between one panel and the following panel; the transfer mechanism C serves to transfer the panel to a second conveyor system D; in the system D the panel is squared and passed through a second sawing mechanism; and following the second sawing operation the flipper mechanism E operates to turn over the trimmed sheet in accordance with a predetermined pattern.

FIG. 31 shows the panels as they come from the forming machine with the top reinforced resin layer being continuous, and the plywood panels 171 arranged one after the other with their ends spaced apart so that between the trailing edge 172 of one panel and the leading edge 173 of the next panel is a connecting web 174 of resin-impregnated fiberglass.

As the panels come from the forming machine in the form above described they are fed directly into the front end of our machine where they are first passed through sawing mechanism A which trims the side edges of the panels. As they pass through the saws the webs between the panels remain unbroken and help to hold the panels against turning or twisting.

After a panel has been sawed and passes a certain point beyond the saws a switch is tripped which brings the break-up mechanism B into operation and this severs the web between this panel and the next one. This makes it possible for the panels to move independently from this point on.

As a panel passes beyond the break-up mechanism it comes to be controlled by the transfer mechanism C the function of which is to transfer the panels to a second saw and conveyor system where the ends of the panels are sawed. The mechanism C accomplishes its transferring function by first speeding up the rate at which a panel passes through the machine after it has been severed from the succeeding panel. This serves to separate a forward panel from the others.

The forward panel passes quickly to where it rests on a temporary support and then when it has moved to a certain position it trips a control device which removes the support and allows the panel to fall onto a carriage below.

Associated with the carriage is the mechanism D for squaring and binding the panel with respect to the carriage. With the panel in squared position and bound to the carriage, the carriage moves to carry the panel laterally through the second set of saws to trim the ends of the panel.

After passing the saws for trimming its ends the panel passes into the flipper mechanism E which at first receives the panel, then holds it, then turns it over and finally releases it, so that it may be taken from the machine.

These mechanisms all have drive means and control means for accomplishing their functions as generally described above without effort or direction on the part of an operator. These drive means and control means will later be described in more detail.

The above general description is given for the trimming of panels having a continuous top layer of a material such as resin-impregnated fiberglass such as illustrated in FIG. 31 of the drawings, but the machine may be used for the trimming of panels which are separate and formed of any material capable of being cut or sawed at its edges.

While the machine is intended for trimming large numbers of panels to the same size there is provision for easy adjustment to accommodate different sizes of panels, that is, different widths, and different lengths of panels. Also the machine will accommodate within reasonable limits panels of widely differing thicknesses.

DETAILED DESCRIPTION

Mechanism A for Trimming the Side Edges

Figure 2:
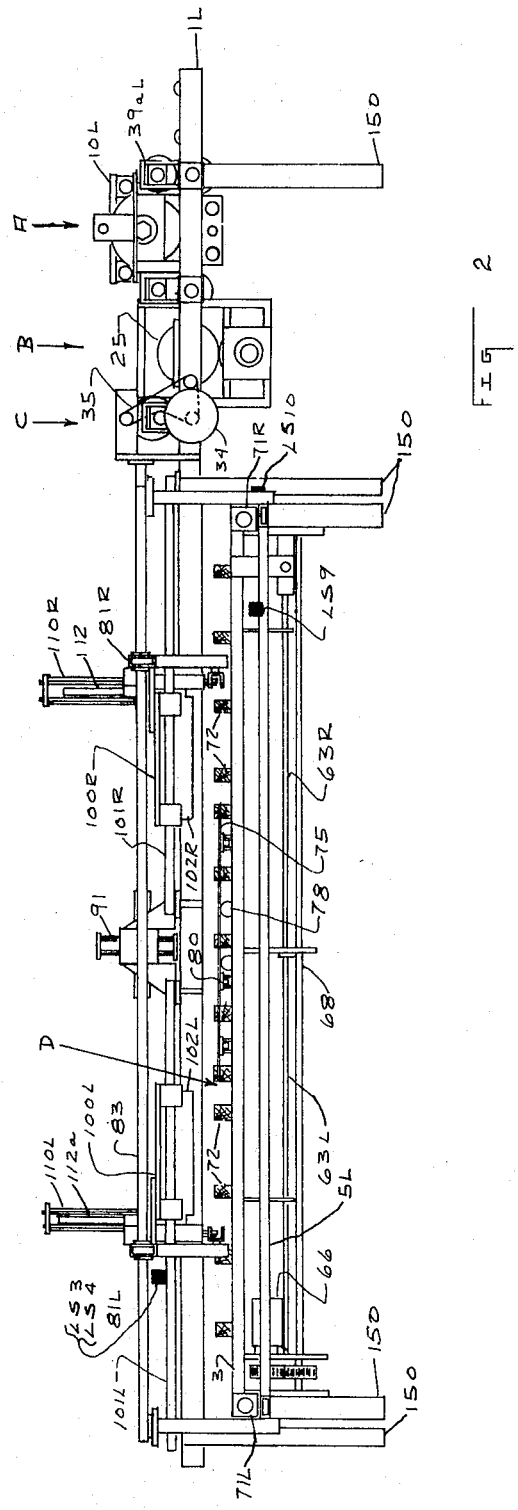
FIG. 2 is a view of the machine in side elevation.
Figure 3:
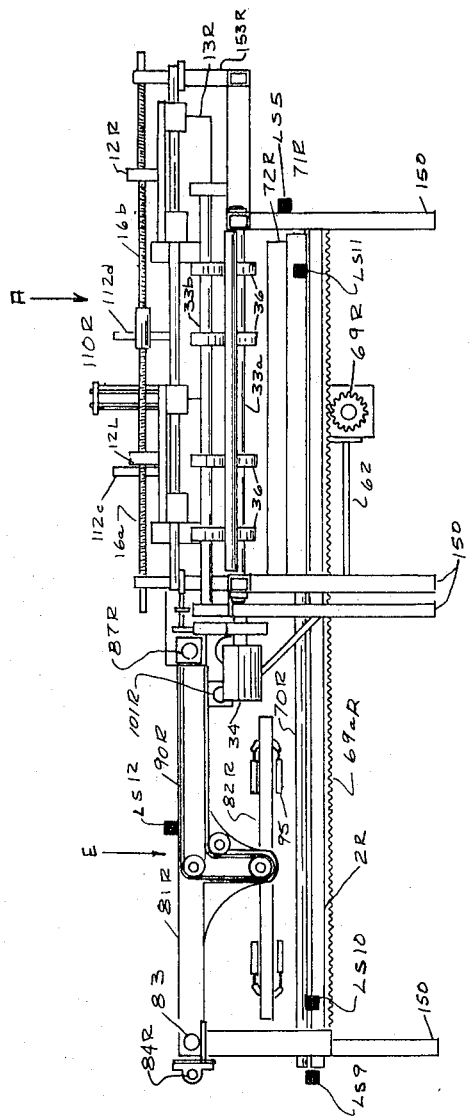
FIG. 3 is a view of the machine in front elevation.
Figure 10:
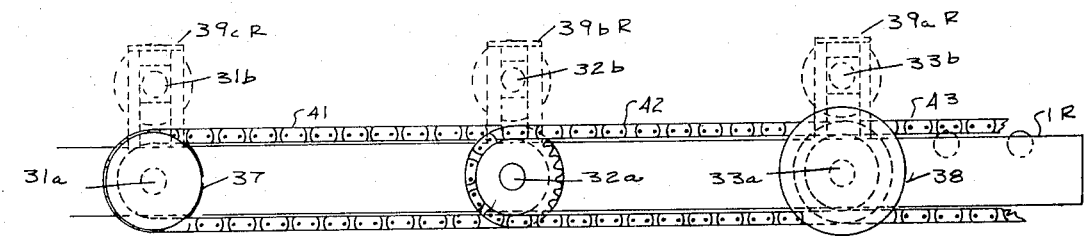
FIG. 10 is a detail view in side elevation showing the drive chains.
Figure 11:
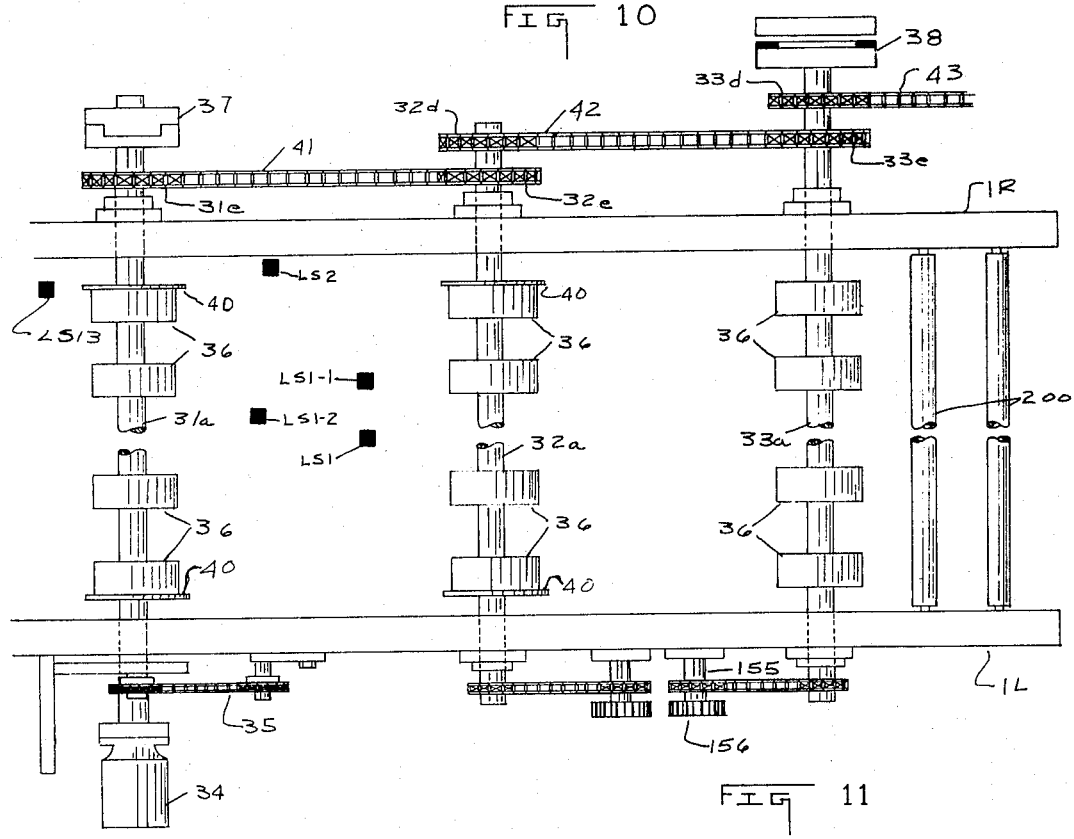
FIG. 11 is a plan view in detail, showing the drive chains, the drive rolls and drive clutches.
Figure 12:
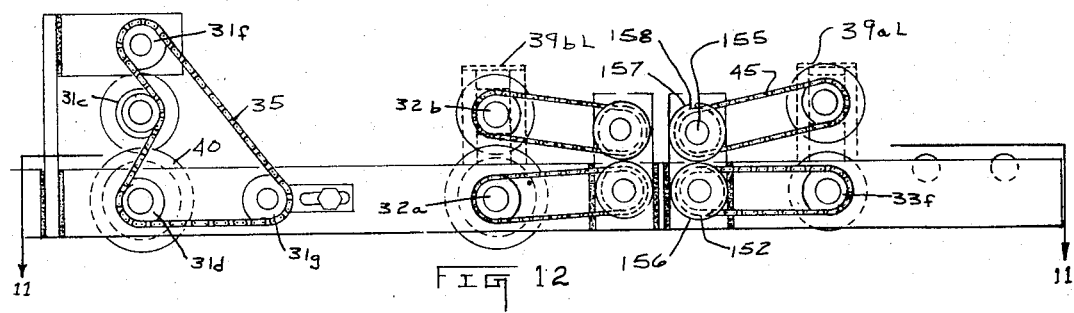
FIG. 12 is a detail view in side elevation, showing mechanism for driving the rolls.

Mechanism A is shown in its relation to the whole machine in FIGS. 1 to 3, and is more specifically shown in FIGS. 4 to 7, with the drive being shown in FIGS. 10 to 12.

This mechanism, as well as the other working parts of the machine, are supported generally in a frame which includes a pair of spaced longitudinal members 1L and 1R, and cross members 2L and 2R which are tied at their ends by structural members 5L and 5R (The latter L accompanying the character denotes "left", and the letter R denotes "right"). These frame members may be welded at their junctions and suitably supported by legs 150 (See FIG. 2).

For mounting the saws we have a pair of shafts 15a and 15b which are spaced apart and are held at their ends by the shaft frame structure 153L at the left end and 153R at the right (See FIGS. 5, 6 and 7) which structures rest upon and are secured to the corresponding frame members 1L and 1R.

Figure 5:
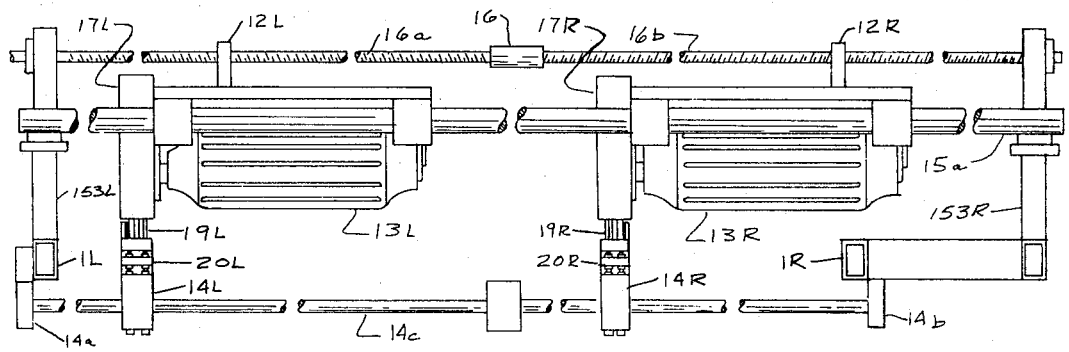
FIG. 5 is a view of the saws and hogger devices in front elevation taken from line 5—5 of FIG. 1.

Referring to FIG. 5, two saw assemblies are provided, saw 19L, guarded by the shield 17L and powered by electric motor 13L and saw 19R guarded by shield 17R and powered by motor 13R. The saw assembly which includes saw 19L and motor 13L is carried by the block 10L through which extends the shafts 15a and 15b; and the saw assembly which includes saw 19R. Motor 13R is carried by the block 10R which in like manner receives the shafts 15a and 15b.

A screw adjusting rod 16 is formed of two parts. On the left the part 16a has its left end rotatably mounted in the frame structure 153L and is threaded with the threads advancing from the center toward the left. The part 16b has its right end rotatably mounted in frame structure 153R and is threaded with the threads advancing from the center to the right. Parts 16a and 16b are joined at the center to form a unitary rod.

The left saw assembly has attached to it a nut carrier 12L which is in threaded engagement with part 16a of rod 16 and the right saw assembly has the nut carrier 12R which is in threaded engagement with the part 16b of rod 16. There is provision at one end of shaft 16 for attaching a crank or wrench so that this rod may be rotated in one direction to cause the assemblies to move apart and in the other direction to cause them to move toward each other thus providing means for accommodating panels of different widths. Of course, it is not important which direction the threads on 16a and 16b advance so long as the threads advance in different directions.

Figure 4:
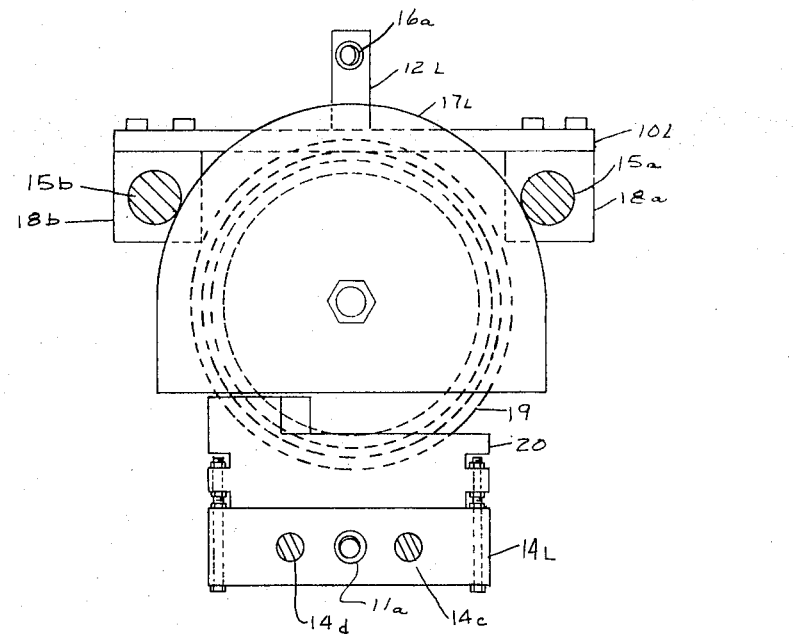
FIG. 4 is a view of one of the saws in side elevation, taken from the line 4—4 of FIG. 1.

It is desirable to provide a device known as a "hogger" which cooperates with a saw to chew up the material which is sawed off in the trimming operation. We provide such a device which, referring to FIGS. 4 and 5, is designated 14L. This device includes the hogger shoe 20L which operates in association with saw 19L and which is carried by the block 14L. Associated with the saw 19R is a second hogger device 20R which is carried by the block 14R. As shown particularly in FIG. 4, these blocks 14L and 14R contain cylindrical holes through which the spaced guide shafts 14c and 14d extend. Shafts 14c and 14d have their left ends fixed in the frame and serve to stabilize the hogger devices as they are slidably moved along the shafts when adjustments are made.

Near the center of each of blocks 14L and 14R is a tapped hole through which extends a threaded shaft 11 which, like rod 16, has its left-hand part 11a threaded in one direction and its right-hand part 11b threaded in the other direction.

Figure 6:
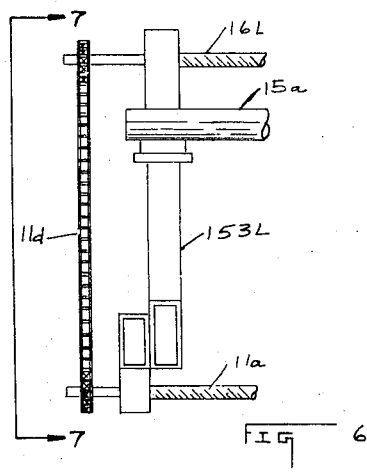
FIG. 6 is a detail view of the hogger saw adjustment in front elevation, taken from line 6—6 of FIG. 1.
Figure 7:
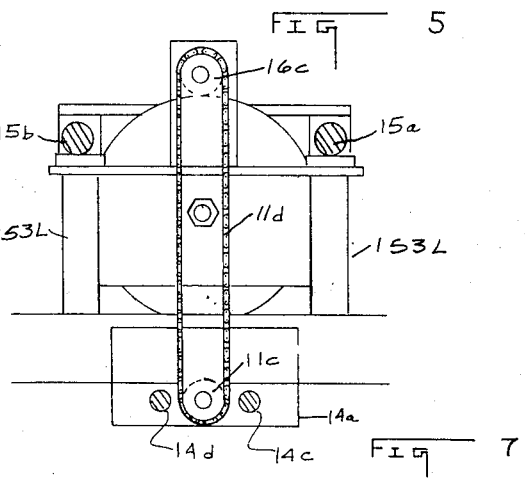
FIG. 7 is a detail view in side elevation of the saw, the hogger device and the adjustment linkage taken from line 7—7 of FIG. 6.

Referring more particularly to FIGS. 6 and 7, the rod and shaft 11 are provided at their left ends with sprockets 16c and 11c respectively, and the sprockets are connected by the chain 11d.

The threads on rod 16 and shaft 11 are of the same pitch so when the rod 16 is turned to move the saws closer together or farther apart the hogger devices are correspondingly moved so as to be in the same relationship with their respective saws whatever the width of the panel for which the saws may be adjusted.

For feeding the panels and passing them through the saw mechanism for trimming the side edges of the panel we provide rolls which in the specific construction illustrated include roller members mounted on shafts. As shown more particularly in FIGS. 10 to 12 the first pair of rolls 33 includes the shafts 33a and 33b which are located one above the other. Their left ends are mounted in the bearing 39aL and their right ends are mounted in the bearing 39aR. The bearings are such as to permit upward movement of shaft 33b against spring pressure. Mounted on shafts 33a and 33b are the roller members 36.

Similarly, the second pair of rolls 32 include the shafts 32a and 32b which have their ends mounted in bearings 39bL and 39bR and have the roller members 36. Likewise shafts 32a and 32b are adapted to be pressed apart in accordance with the thickness of the material being passed between the rolls. There is, however, one difference in that there is attached to the outside surface of the end roller members on shaft 32a a guide plate 40 which is intended to retain the side edge of the panels and help keep them in alignment.

The wheels or roller members 36 on shafts 33a and 33b are secured to the shafts with set screws and have the guide plates positioned so that the edge of the panel rides on the wheels next to the guides. For convenience a shaft together with its wheels or roller members may be called a "roll" and two shafts, such as 33a and 33b, together with their assembled roller members, may be called a "pair of rolls".

As shown at the right-hand end of FIGS. 1 and 2 the saws are located between the rolls 33 and 32 so that the panels as they enter the machine pass between the pair of rolls 33, then into the saws, and then between the pair of rolls 32.

In order that the machine be fed at the same speed as panels are delivered to it the power for driving the pairs of rolls 33 and 32 is taken from the same source that drives the forming machine. Power from this source drives the chain 43 (FIGS. 10 and 11) located at the right hand side of the machine. Chain 43 drives sprocket 33d attached to shaft 33a. At its end this shaft is provided with a low inertia clutch 38. The shaft 33a has attached to it a sprocket 33e which drives a chain 42 which drives shaft 32a through sprocket 32d.

At the left side of the machine (See particularly FIGS. 11 and 12) the shaft 33a has attached to it a sprocket 33f which is connected by chain 151 to a sprocket 152 mounted on shaft 154 which is rotatably mounted to the frame member 1L. Above shaft 154 is a shaft 155 similarly mounted, and the gear 156 mounted on shaft 154 is meshed with the gear 157 on shaft 155. The sprocket 158 on shaft 155 connects through chain 45 with the sprocket 159 on shaft 32b. Therefore, the shaft 33a, through appropriate gearing mechanisms drives also the shaft 33b yet allows for the separation of shaft 33b from 33a to allow for the thickness of panels being passed between this pair of rolls.

By similar mechanism and in a similar manner the shaft 32a drives the shaft 32b.

The Break-up Mechanism

Figure 8:
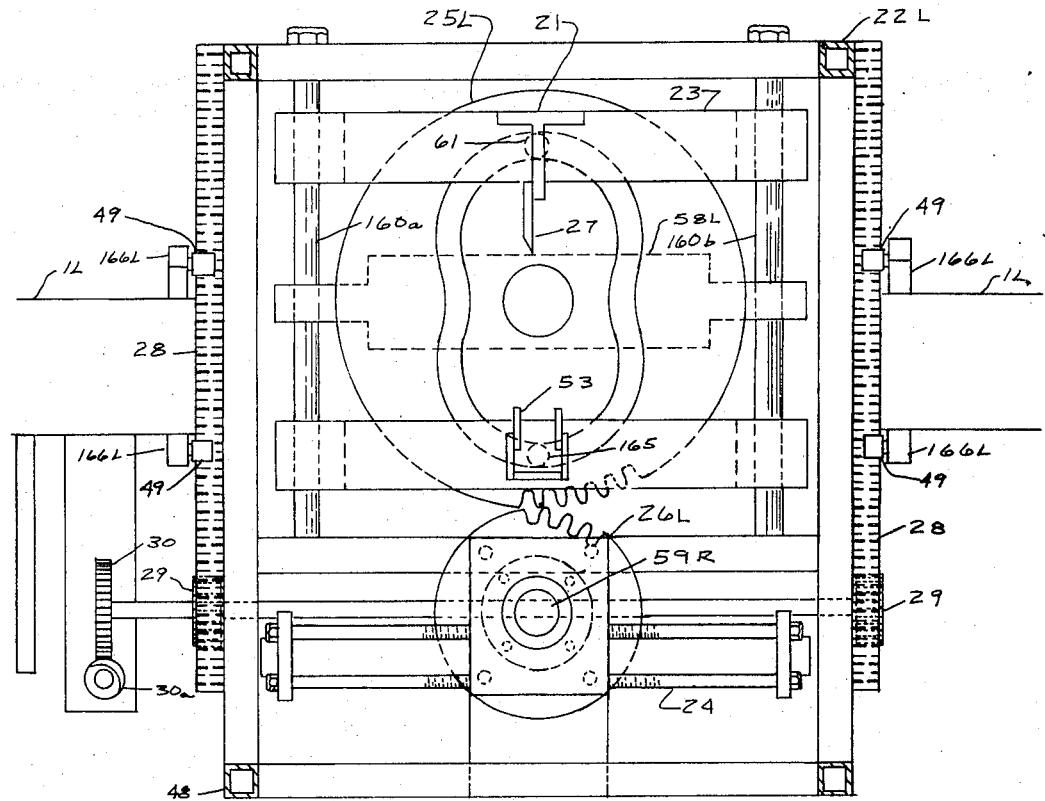
FIG. 8 is a detail view in side elevation, of the break-up mechanism.
Figure 9:
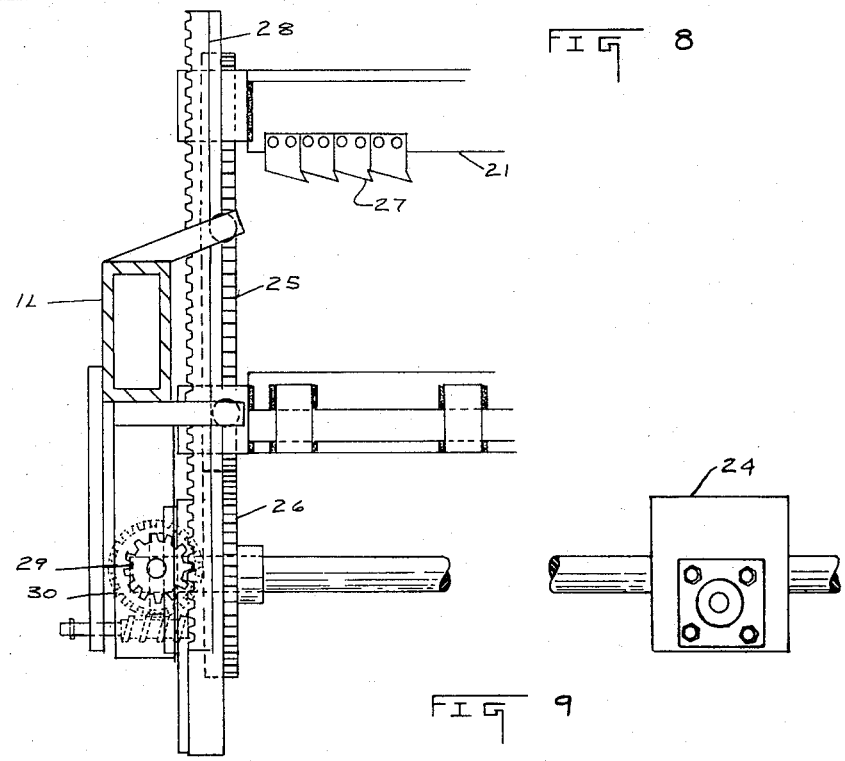
FIG. 9 is a detail view in front elevation showing the knife carrier, the knife, the drive train, and the adjustment gearing.

Reference to FIGS. 1 and 2 shows that next to the sawing mechanism A is the break-up mechanism B and for this attention is directed particularly to FIGS. 8, 9 and 9a.

A rigid box-like frame 48 is mounted at its one end on frame member 1L and at its other end on frame member 1R. Frame 48 includes the upright members 22L and 22R on its left-hand end and corresponding members on its right hand end. It has upper and lower transverse members 22c and 22d extending between its left and right ends on the front side and corresponding members on its rear side. Provision is made for raising or lowering frame 48 with respect to the main frame members 1L and 1R and means for doing this will later be explained.

The knife carrier 21 has its left-hand end attached to the cross strap 23L and its right-hand end attached to a similar strap at the right-hand side of the machine. Strap 21 is T-shaped in cross section and attached to its depending portion are a number of knife sections 27 which when attached next to each other provide the knife which is to sever the web between the panels. As shown particularly in FIG. 9a these sections have slanted bottom edges with the tips 27a extending slightly over the next succeeding section.

The anvil carrier 53 has its left-hand end attached to the cross strap 161L and its right-hand end attached to a similar strap at the right-hand side of the machine. The anvil carrier 53 is in the form of a channel iron and has attached to each side of the channel the anvil bars 53a.

Referring to FIG. 8, the straps 23 have their left ends provided with bushings which slidably engage guide bar 160a and their right ends have bushings which slidably engage guide bars 160b. Similar structure is provided at the right-hand side of the machine. Thus, it is clear that the knife carrying structure, and also the anvil carrying structure, may move up and down guided by the bars 160a and 160b at the left-hand side of the machine and by similar bars at the right-hand side of the machine.

For moving the knife carrier and the anvil carrier toward and away from each other, we provide the gear 25L at the left-hand side and gear 25R at the right-hand side. Gear 25L is provided at its center with a pivot piece 56L which is retained in the cross frame member 58L which has its ends attached to bars 160a and 160b. The gear 24R, at the right-hand side of the machine, is similarly provided with a pivot piece which is retained in a cross frame member having its ends attached to bars 160c and 160d.

On its inner side gear 25L is provided with a cam track 164 of the shape illustrated in FIG. 8, and received in this cam track at its uppermost point is the roller 61 which is rotatably mounted at the center of slide strap 23L. Received in the lowermost point of cam track 164 is the roller 165 which is rotatably mounted at the center of strap 161.

Similarly, gear 25R is provided on its inner side with a cam track, and rollers engaging the top and bottom of this track are attached respectively to the right ends of the knife carrier and the anvil carrier.

When gears 25L and 25R are rotated simultaneously by engagement with gears 26L and 26R which are fixed on shafts 59L and 59R. Shafts 59L and 59R have their outer ends rotatably mounted in the frame and at their inner ends are connected with a hydraulic drive device 24 of well-known manufacture which is capable of driving the shafts 360° in one direction and when next operated 360° in the other direction. The gears 25L and 25R each have twice as many teeth as the gears 26L and 26R with which they are engaged, so rotation of gears 26L and 26R through 360° produces rotation of gears 25L and 25R through 180°.

Referring more especially to FIG. 8, it may be seen that with roller 61 at the top of the cam track and roller 165 at the bottom of the track, the knife 27 is well separated from the anvil bars 53. However, when the gears 25L and 25R are rotated through 90° the knife will have been brought down and the anvil bars brought up to a position in which the bottom of the knife has passed below the top of the anvil bars and down between them. This means that anything between the knife and the anvil bars will have been severed. Then when the gears 25L and 25R rotate through another 90° the knife and anvil bars will separate and return to their original positions.

The position at which the knife and anvil bars come together may be critical and to raise or lower this position we provide means for raising or lowering the frame 48 with respect to the main frame of the machine.

Referring again to FIGS. 8, 9 and 9a, there is mounted at the four corners of frame 48 the vertical rack pieces 28. The frame 48 is located within the frame members 1L and 1R, and is guided in its movement vertically with respect to members 1L and 1R by the rollers 49L which are carried by frame members 166L and 166R fixed respectively to the main frame members 1L and 1R.

Rotation of the worm 30a in one direction turns gear 30 in one direction which through gear 29L and 29R and their engagement with racks 28 serve to raise the frame 48 with respect to the main frame, and rotation of worm 30a in the opposite direction, therefore, serves to lower the frame 48 with respect to the main frame.

Such adjustment to raise or lower frame 48 and the knife and anvil carriers within it with respect to the main frame is desirable to accommodate thicker or thinner panels which have as their top layer a continuous sheet of reinforced resin. When the plywood under layer is thicker the web between the panels is raised and it is necessary to raise frame 48 to bring the anvil bars up to the under side of the web between the ends of the plywood as the knife descends to strike and sever the web, and conversely when the plywood layer is thinner it is necessary to lower the frame 48 so that the anvil bars will not strike the web before the knife.

The Transfer Mechanism

After the web between the panels has been sheared or otherwise severed the next event is to transfer the forward panel to mechanism for squaring the panel and trimming the ends. The first step in the transfer operation takes place when the panel is sent on at a faster rate of speed than the speed at which the other panels are moving so as to separate the forward panel from the others and thus prevent jamb-ups while the positioning and squaring operations are taking place.

Referring again to FIGS. 10 to 12, there is provided a pair of shafts 31a and 31b, with shaft 31b over shaft 31a. Rolls 31 are horizontally aligned with rolls 32 and 33. The end rollers 36 on shafts 31a and 31b, like those on shafts 32a and 32b, are also provided with the guide flanges 40 on their outer edges, to act as guides for the panels as they pass through rolls 31.

Shaft 31a is driven by shaft 32a through sprocket 32e, chain 41 and sprocket 31e. Shaft 31b is driven by shaft 31a through sprocket 31d, chain 35, and sprocket 31c. The idler sprockets 31f and 31g also engage chain 35 and permit an arrangement where shafts 31a and 31b may separate vertically without binding or disengagement of the drive.

Although shafts 31b and 31a are normally driven, as above described, at the same rate of speed as shafts 31a and 33a, there is provision for driving them at a greater rate of speed. At its right-hand end shaft 31a is provided with a clutch 37, and at its left-hand end shaft 31a is provided with a motor 34 which is designed to drive the shaft faster than its normal rate with clutch 37 permitting the overdrive. The motor 34 may be hydraulic or electric as may be convenient.

When shaft 31a is driven faster than shafts 32a and 33a the panel then engaged between rolls 31 will be advanced and passed by itself quickly forward within the machine, with its side edges supported by the panel drop supports 76L and 76R.

The support 76R at the right of the machine is a strip extending longitudinal (See FIGS. 1 and 26) and when in support position (dotted lines in FIG. 26) serves to support the right-hand edge portion of the panel. At spaced points along its length this strip is pivotally mounted to the strip 76a which is attached to the frame. At these spaced points the strip 76R has on its under side the levers 167 which are pivotally connected at their ends to the pistons of the fluid cylinders 79. Thus when the fluid cylinders operate to extend their pistons this moves the supporting strip about its pivot into the position shown in dotted lines in FIG. 26 so as to support the side edges of the panel which is passed onto the strip, and conversely when the pistons are retracted, the strip 76R is moved about its pivot to remove support of the right side edge portions of the panel.

Similarly, the strip 76L which is spaced from the strip 76R by a distance a bit greater than the width of the panel, extends in like manner and is similarly mounted pivotally with the strip 76b secured to the frame, and spaced cylinders of the same type mounted on strip 76a operate through similar connections to hold strip 76b in support condition when the pistons are extended and to move this strip pivotally when moving to retracted position to remove support for the left side edge portion of the panel.

The cylinders 79 are arranged to operate in unison so that when the forward panel moves to a position where it trips the control both strips 76L and 76R drop down to permit the panel to fall down to the bed of the carriage (See FIGS. 13, 14, 28 and 29).

Figure 25:
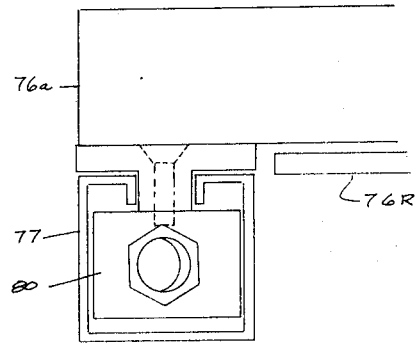
FIG. 25 is a detail view of the panel drop adjustment including its carrier and nut.
Figure 27:
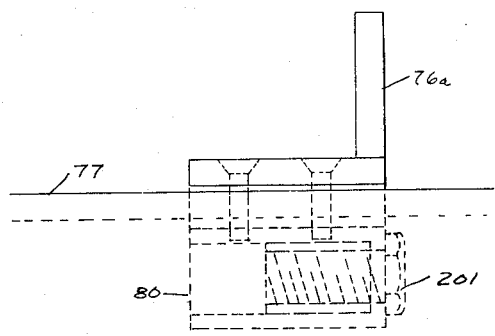
FIG. 27 is a detail side view of the panel drop adjustment including the carrier and nut.

The strips 76a are attached to the frame in a manner which will permit adjustment to allow for different width panels. This attachment is illustrated in FIGS. 25 and 27. The ends of the strips 76a are attached to the frame member 77 through the block 80, and the set screws 199 secure the panel drop assembly to the adjustment nut 201.

The strips 76b are attached to the frame in a manner similar to that above described for strips 76a.

The Conveyor System D

Figure 28:
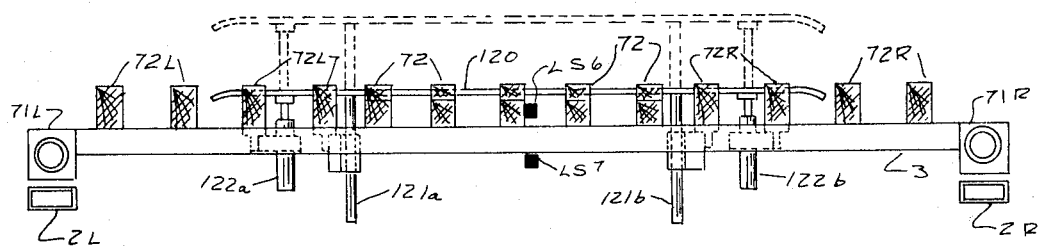
FIG. 28 is a detail view, partly in section, of the central panel support on the carriage in operated (dotted lines) and non-operated (solid lines) positions.

While the side edges of the panels are supported on strips 76L and 76R the center portion of the panel is supported on the bar 120 (See FIG. 28). This bar is in its upper position, as shown in dotted lines in FIG. 28, being pressed in this position by the fluid cylinders 122a and 122b while the strips 76L and 76R are in supporting position. However, when pressure on cylinders 122a and 122b is relieved and the strips 76R fall, the bar 120 also moves down permitting the panel to fall flat on the bed of the carriage. (See FIGS. 13 and 29).

Figure 29:
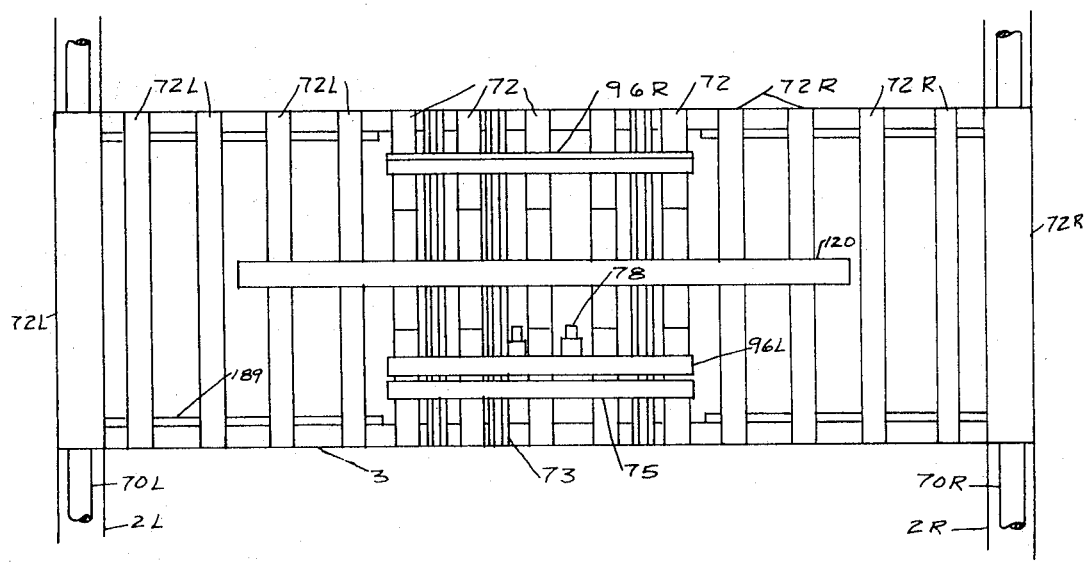
FIG. 29 is a detail plan view of the carrier and the mechanism for squaring the sides of the panels.

The bed of carriage 170 is formed of the adjustable slats 72L on the left, adjustable slats 72R on the right and stationary slats 72 in the center (See FIG. 29). These slats are supported at their ends on the cross members 3L and 3R, forming a carrier frame which is slidably mounted about shafts 70L and 70R and supported on frame members 2L and 2R by roller members 71L and 71R.

In order that the panel be properly squared it is desirable first to make such that the panel lays flat on the carrier bed and that it is not displaced endwise. We have found that some panels may be slightly warped or in falling to the carrier bed become displaced endwise. To correct such irregularities we provide mechanism for pressing the end portions of the panels downwardly and means for positioning the ends of the panel.

Referring now to FIGS. 2, 21, 22, 23 and 24, the presser bar 175L is connected at its center to the piston of cylinder 110L which is mounted on frame member 81L. At its sides are the guides 112aL and 112bL which extend upwardly through bushings 176aL and 176bL.

It will be seen that operation of the cylinder 110L to extend its piston presses the bar 175L downwardly with guides 112aL and 112bL sliding in bushings 176aL and 176bL until the presser bar moves against the end portion of the panel.

Figure 23:
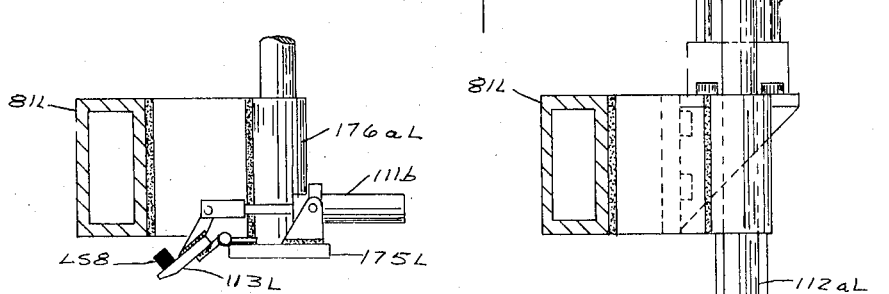
FIG. 23 is a side view in elevation of the panel end positioner in its retracted position.
Figure 24:
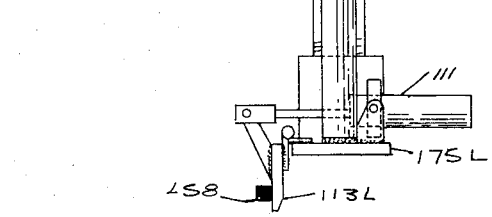
FIG. 24 is a side view in elevation of the panel end positioner within the end lip in closed position with the cylinder pistons extended.

Hingedly attached to presser bar 175L is strip 113L and mounted on the top side of bar 175L are the cylinders 111. Cylinders 111 are arranged so that when their pistons are extended they push the strip 113 about its hinged connection with bar 175L to a position where the strip 113L is at 90° with bar 175L. FIG. 23 shows the device in open position with strip 113L moved to open position and with cylinder 110L in retracted position. FIG. 24 shows the same device after the cylinder 111 has operated to bring the strip 113L to closed position where it makes 90° with the bar 175L, showing cylinder 110L in its extended position.

As the bar 175L descends against the end portion of the panel the strip 113L is in the position shown in FIG. 23, but as this bar 175L contacts the panel the cylinders 111 are operated to move the strip 113L to the position shown in FIG. 24 which serves to bring the end of the panel into proper position.

It is understood that a second bar 175R is disposed over the trailing edge portion of the panel and the cylinder 110R mounted on frame member 81R operates to bring this bar down onto the panel, and another set of cylinders 111 mounted on the bottom of 175R operate to bring the strip 113R about its pivot to confine the right-hand end of the panel.

Referring to FIG. 29, the strips 96L and 96R are disposed in spaced relation on the carriage bed. These strips are adjustably secured in cross members 73 as will later be explained and are intended to be spaced apart such that the side edges of the panels rest upon them. The strip 96R has a backing flange 96R1 which may abut and serve to retain the right-hand side edge of a panel.

Figure 26:
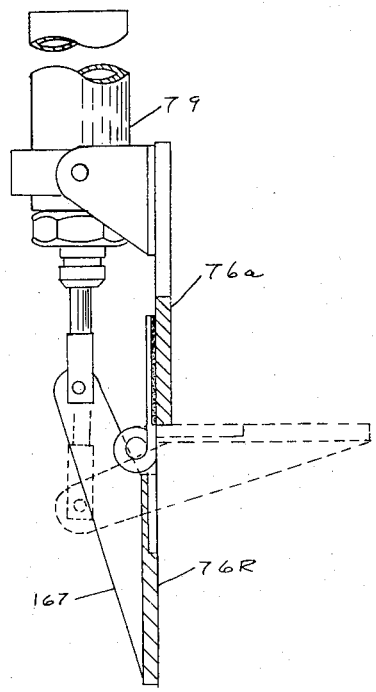
FIG. 26 is a detail view partly in section showing the panel drop hinge in open position (solid lines) and in closed position (dotted lines)

The strip 96L also is adjustably secured in cross members 73. Another strip 75 is hingedly connected with strip 96L. The fluid cylinders 78 which are mounted on the under side of strip 96L may be identical to the cylinders 79 of FIG. 26 and have their pistons connected as shown in FIG. 26, so as to move the strip 75 upwardly about its hinged connection to bring it into a plane at right angles with the strip 96L. Thus, when the panel is laying on the bed of the carrier its right-hand side edge is retained by the flange 96R1, and when the cylinders 78 operate the strip 75 is brought up against the left-hand side edge to bring the panel to a position where its side edges are at 90° with the direction of the movement of the carrier.

With the sides of the panel made square, and held in squared condition the cylinders 111 operate to open the lip members 113L and 113R at the ends of the panels and cylinders 110L and 110R operate to bring back the bars 175L and 175R to their raised positions, which leaves the carriage free to move laterally to thus undertake the sawing of the end edges.

Mechanism D for Trimming the Ends of the Panels

The saw devices which cut the end edges of the panels bear much resemblance to the saw mechanism A which cuts the side edges of the panels. Referring particularly to FIG. 1, the spaced guide shafts 101L, carried by the frame, support the motor and saw assembly 100L while the spaced shafts 101R, also carried in the frame, support the motor and saw assembly 100R. Assemblies 100L and 100R are slidable along the shafts 101L and 101R to vary the length to which the panel is to be cut.

A screw adjustment is provided for varying the distance between the saws. This includes the rod 87 which has its ends rotatalby supported in frame members 176 and 177 with threads advancing in opposite directions from its center. Motor-saw assembly 100L has the nut connector 178L which is in threaded engagement with part 87L of the screw rod, and motor-saw assembly 87R has the nut connector 178R which is in threaded engagement with part 87R of the screw rod. Part 87L extends in threaded relation with the adjustable frame member 81L and part 87R extends in threaded relation with the adjustable frame member 81R.

The spaced frame members 81L and 81R each extend across the entire transverse dimension of the machine. At the right-hand side the guide member 89 extends through bearings in these members 81L and 81R and at the left-hand side guide member 83 extends through bearings in these members 81L and 81R.

At the right-hand side of the machine the screw rod 88 has its one end 88L in threaded engagement with member 81L and extends through a bearing in the frame support 179 and has its other end 88R extending in threaded engagement with member 81R and through a bearing in frame support 180. Likewise at the left-hand side of the machine the screw rod 84 has its one end 84L in threaded engagement with frame extension 181; and has its other end 84R in threaded engagement with frame member 81R and extending through a bearing in frame extension 182.

Screw rod 87 is connected with screw rod 88 through the sprocket and chain arrangement 183 and with screw rod 84 through the sprocket and chain arrangement 184. Screw rod 87 may also be connected through chain and sprocket drive with another screw rod which is threadly engaged on one side with a hogger device under the saw of the saw assembly 100L and which is threadedly engaged on its other side with a hogger device under the saw of the saw assembly 100R, these hogger devices being slidably mounted on cross shafts anchored at their ends in the main frame.

Each of the above described screw rods have threads advancing from the center toward each end so that when rod 87 is turned in one direction the saw assemblies 100L and 100R are moved apart and the frame members 81L and 81R are moved apart, and when rod 87 is turned in the opposite direction the saw assemblies 100L and 100R are moved toward each other. Also the frame members are moved toward each other and the hogger devices are moved so as to remain in position with respect to the saws. Further the cylinder 100L and pusher bar 175L and associated mechanism, being mounted on frame member 81L, are correspondingly moved together with or apart from the cylinder 110R, the pusher bar 175R and associated mechanism which are mounted on member 81R, depending on the direction in which the screw bar 87 is turned.

For driving the carriage we provide a hydraulic motor 66 (FIG. 13) carried in the carriage frame which drives the shaft 68 through gears 67 and 67a. On the left end of shaft 68 is a gear 69L which engages a rack 69aL (FIGS. 3 and 14) mounted on the under side of frame member 2L. On the right-hand end of shaft 68 is a gear 69R wich engages a rack 69aR on the under side of frame member 2R. Thus, operation of motor 66 in one direction serves to extend the carriage laterally of the main frame, and rotation of motor 66 in an opposite direction serves to retract and move the carriage back to its original position.

Figure 13:
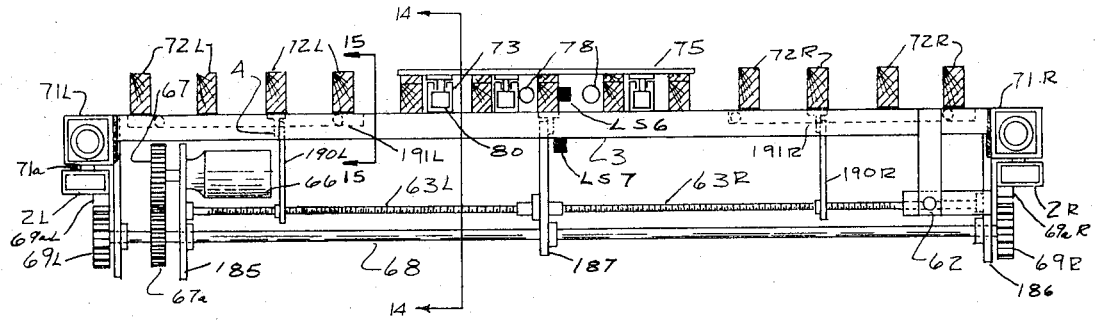
FIG. 13 is a sectional view of the carriage, including the hydraulic drive motor.
Figure 14:
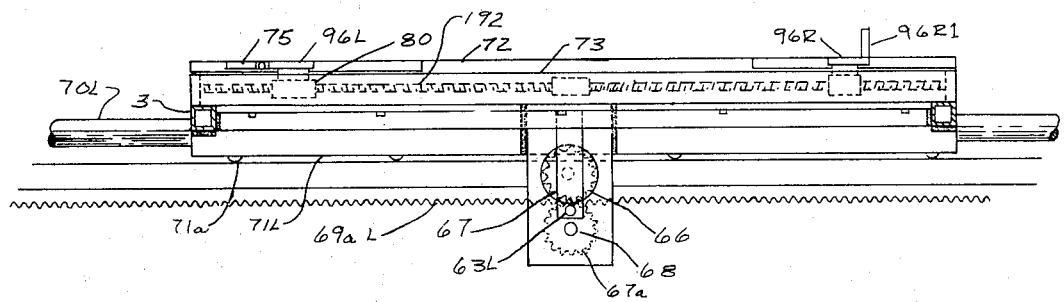
FIG. 14 is a detail view in side elevation of the carriage, showing the adjustment for different panel widths.
Figure 15:
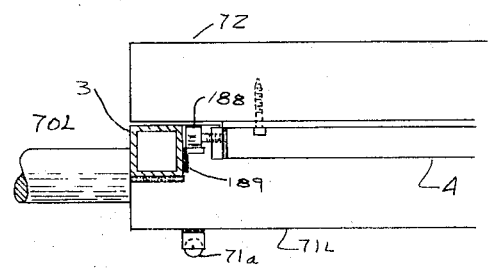
FIG. 15 is a detail view of the carriage panel support adjustment as seen from line 15—15 of FIG. 13.
Figure 16:
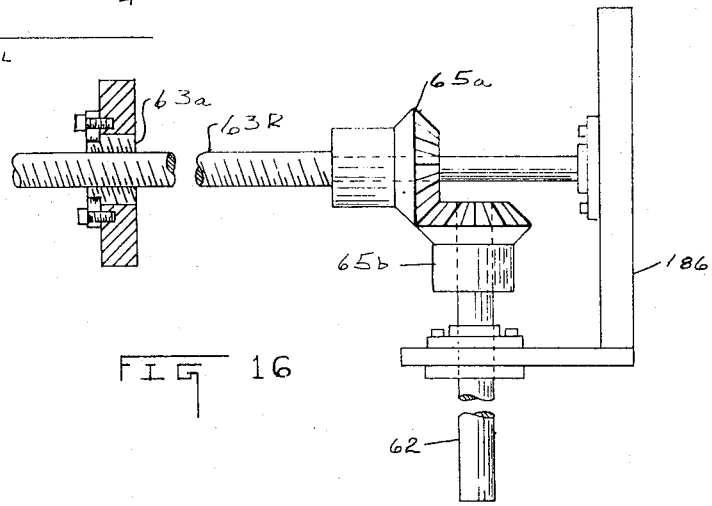
FIG. 16 is a plan view in detail of the carriage panel support adjustment as seen from line 16—16 of FIG. 13.
Figure 21:
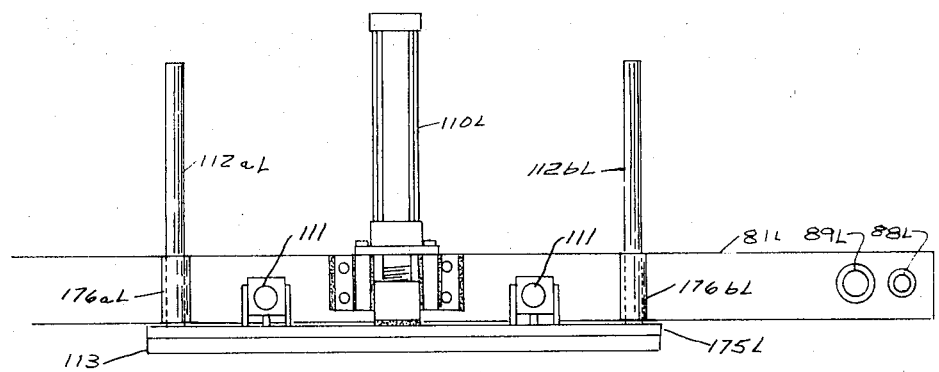
FIG. 21 is a detail view in front elevation of the panel end positioner.
Figure 22:
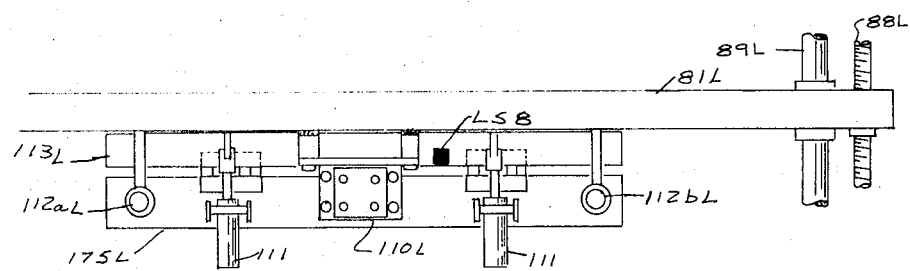
FIG. 22 is a detail view in front elevation of the panel end positioner.

With the saw mechanism fixedly mounted with respect to the main frame and with the carriage moving past the location of the saws it is desirably that the saws not be aligned with one of the slats 72L or 72R which provide the carriage bed. A device to prevent this and to bring one of the slats into position to properly support the ends of the panels is illustrated in FIGS. 13, 15 and 16. A screw rod 63 is rotatably supported at its left end in carriage frame extension 185 and at its right-hand end in frame extension 186, and at its center in frame extension 187. One of slats 72 (FIGS. 13 and 15) has attached to it a T-strip 4 extending longitudinally of the slat. As shown in FIG. 15 the end of this T-strip is provided with a roller 188 which rides on a flange 189 attached to the carriage frame member 3. The other end of strip 4 may likewise be arranged with a roller which rides on a carriage frame member.

The plate 190L is attached to the depending flange of T-strip 4 and has its lower end in threaded engagement with the left-hand part 63L or rod 63, and the plate 190R is attached to a corresponding T-strip which is attached to a slat 72R and has its lower portion in threaded engagement with the part 63R of rod 63.

For driving rod 63 a beveled gear 65a is fixed to the right-hand end portion of rod 63 which meshes with the bevel gear 65b on shaft 62. Rotation of shaft 62 in one direction rotates shaft 63 and since the threads on shaft 63 advance in opposite directions from the center the plate 190 pushes the slat 72L toward the left and the plate 190R pushes the slat 72R toward the right, while rotation of shaft 62 in the opposite direction causes the slats 72L and 72R to move toward each other. The slats 72L may be tied together by the tie 191L, shown in dotted lines in FIG. 13 and the slats 72R may also be tied together by the ties 191 R, also shown in dotted lines in FIG. 13. In this way the slats 72L and 72R may be moved in unison either toward or away from each other, to bring the slats to a position where they miss the saws and properly support the ends of the panels.

It is important that the mechanism for squaring the sides of the panels be adjustable to accommodate different widths of panels. Referring now to FIGS. 25, 27 and 13, the cross members 73 are hollow with an opening on the top side, and contained inside of each of these members is a screw bar 192 which has threads advancing in opposite directions from the center. On the left screw bar 192 makes engagement with a nut holder 80L which is secured to the under side of the strip 96L, and on the right screw bar 192 makes engagement with the nut holder 80R which is secured to the underside of strip 96R.

Turning screw bar 192 in one direction serves to bring the strips 96L and 96R closer together at the points of attachment of nut holders 80L and 80R.

By having a number of cross members 73 containing apparatus similar to that above described at spaced points along the length of strips 96L and 96R it is possible to line up these strips for exact spacing between them and to make them accurately 90° with the transverse axis of the carriage.

The Flipper Mechanism

The flipper mechanism E is seen principally in FIGS. 1, 3 and 17 to 20. Its purpose is to receive the fully trimmed panels and in accordance with a predetermined pattern to turn the panels and deliver them from the machine in the desired position.

The second and finishing cut of the panels is made when the carriage moves laterally with the squared panel on its bed and the end edges are sawed.

As the panels are moved further in a lateral direction the end edges are received in the channel members 82L and 82R which are positioned at the same height as the panel when it lies flat on the carriage bed.

Channel member 82R is pivotally mounted at its longitudinal center on the inside of extension 193R of the adjustable frame member 81R. The pivot piece 194R extends through extension 193R and on the outside of extension 193R is provided with a sprocket 195R.

Channel member 82L is similarly mounted on a downward extension of adjustable frame member 81L with a pivot piece 194L carrying a sprocket 195L.

A hydraulic motor 91 drives shaft 86 whch has a left-hand splined portion 86L which extends through member 81L and has its end rotatably carried in frame extension 176, and has a right-hand splined portion 86R which extends through member 81R and has its end rotatably carried in frame extension 177. Rotation of shaft 86 by motor 91 operates through chain 90L and sprockets 196L and 195L on the other side to turn through pivots 194L and 194R the channel members 82L and 82R. The idler sprockets 197L and 198L on the one side serve to keep chain 90L aligned with the frame structure, and similarly the sprockets 197R and 198R and the other side serve to keep chain 90R aligned with the frame structure.

The motor 91 may be of common manufacture, of the type utilizing a gear and a rack, the rack being driven a given distance in one direction, and then on the next operation being driven the same distance back to the starting position.

It is necessary that the channel members 82L and 82R remain normally in a horizontal position so as to be able to receive the panels as they come along on the bed of the carriage. To accomplish this we provide a locking device which is more clearly illustrated in FIG. 19. This device is mounted on the frame extension 193R and includes a fluid cylinder 92R which carries a plunger 93 on its piston, which plunger engages the notch of a cam 94R secured to the pivot member 194R. Engagement of the plunger 93R in the notch of cam 94R serves to lock the channel member 82R in horizontal position. A similar cam locking device is also mounted on extension 193L of member 81L which serves to releasably lock the channel member 82L in horizontal position.

Operation of the cylinder 92R to allow retraction of the plunger from the notch 197R of cam 94R permits the channel member 82R to turn, but when the channel member has turned 180° and the cylinder 92R is relieved to permit the plunger 93R to enter the notch 198R the channel member is in inverted position and again locked. When the cylinder is again operated to permit retraction of the plunger the motor may operate through suitable gearing to turn the channel member back 180° to the starting position.

Normally when the channels 83L and 82R containing a panel therein come to be tilted through actuation of the flipper mechanism the panel would slide right out of the channel pieces. To avoid this we provide the fluid cylinders 95, located on the top and bottom sides of the channels, at each end of each channel. This structure is more clearly illustrated in FIG. 20 where the finger member 95a is pivotally mounted on the channel with its tip 95b aligned with a slot 95c in the top of the channel member. Finger member 95a is connected with the piston of cylinder 95 so that when the cylinder operates to extend the piston it moves the finger member about its pivot and presses its tip through the slot and against the panel contained therein. This operative condition is illustrated by the lower cylinder 95 in FIG. 20. With both upper and lower cylinders so operated on both sides of the panel the panels are held within the channels even when the channels are turned with the end openings pointed downwardly. Operation of the cylinders 95 to retract their pistons again operates to free the panels and permits them to be removed.

Operation

The operation of the machine will now be described in connection with the passage through the machine of a series of plywood panels having a continuous top layer of resin-impregnated fiberglass, such as shown in FIG. 31.

When the machine is turned on for operation both sets of saws are running and the rolls 33, 32 and 31 are running, being driven through chain 43 which takes its power from the same source as the conveyor system of the forming machine.

Referring now to FIGS. 1 to 12, and more particularly to FIG. 1, the plywood panels bearing their continuous top resin layer, as they come, continuously, at a certain rate, from the forming machine, pass over the idling rolls 200 at the front of the machine and the leading end edge 173 of the first panel enters between rolls 33 and is driven by these rolls at the same linear speed.

Next the side edges of the panel are engaged by the saws 19L, and 19R and as the panel moves forwardly a small amount of the side edge portions are cut off and the cut away material chewed into sawdust through operation of the hogger devices 20L and 20R. The raw panels need to be slightly wider, and also longer, than is desired for the finished width and length of the panels so that some material may be cut off in the trimming operation. The sawdust produced may be carried off suitably in an exhaust system.

Passing on from this first pair of saws, the leading edge 173 of the panel enters between the rolls 32 and here the newly trimmed right side edge is retained by the flanges 40 on the right end rollers 36 of this pair of rolls, while the newly trimmed left side edge is retained by the flanges 40 on the left end rollers 36. Flanges 40 on each side serve to keep the panel in alignment and prevent it from movement to either side.

Attention is now called to the black squares in FIG. 1 and to the sequence in which they are engaged by the leading edge 173 of the panel. The first switch LS1, when engaged by the panel's leading edge 173, performs in itself no function in the operation of the machine, but does set up a part of a circuit which when completed initiates operation of the break-up mechanism B. Also operation of LS1 may produce a signal on an instrument panel indicating a panel is in the machine.

The requirement that more than one switch be thrown before a machine function takes place is a safety measure and prevents accidents which may occur if a single switch should be touched by workmen or through some minor irregularity.

When the leading edge 173 of the panel engages switch LS1-1 the circuit for operating the break-up mechanism B is proved but is not completed until the trailing edge 172 of the panel engages switches LS1 and LS1-1 in sequence to reset these switches and then engages switch LS1-2. This engagement of the trailing panel edge 172 with switch LS1-2 operates to turn on the motor 34 which starts the overdrive of rolls 31 to run these rolls at something like three times their regular speed. The switch LS1-2, having been conditioned through contact with the panel's edge is operated when reset by the trailing edge 172 of the panel which completes the circuit to turn on hydraulic drive device 24 to start operation of the break-up mechanism B.

The device 24 may include a hydraulic motor which drives a rack and gear, which serves to move the rack quickly all the way in one direction and drive the cam gears 25L and 25R through 180°.

The knife carrier 21 has its end rollers in the upper part of the cam track on the inner side of the cam gears 25L and 25R and the anvil carrier 53 has its end rollers engaged in the lower part of the same cam track. By reference to the shape of this track (FIG. 8) it is seen that rotation of the cam gear through the first 90° brings the knife carrier first downwardly and the anvil carrier upwardly, and rotation through the latter 90° serves to raise the knife carrier while lowering the anvil carrier. Thus the anvil bars 53a are brought up between the trailing edge of one panel and the leading edge of the following panel to a point where the anvil bars touch or almost touch the underside of the web 174 between the panels. At the same time the knife 27 is lowered to strike the top side of the web 174, press it against the anvil bars and to sever it as the knife passes to it lowermost point between the anvil bars.

The action of this break-up mechanism is quick and positive and may take place in a fraction of a second, preferably about one-eighth or one-tenth of a second, while the panels are still in linear motion through the machine.

The shape of the knife sections illustrated particularly in FIGS. 9 and 9a have been found to reduce the amount of pressure necessary to force the knife through the reinforced resin web 174. The slanted lower edge of the sections and the structure by which the lower points of the sections to extend somewhat over the edge of the adjacent section, contributes to produce a cutting rather than a blocking action.

When the break-up mechanism has completed its 180° cycle cam gear 25R makes engagement with switch LS2 which operates to set the drive device 24 for movement in an opposite direction the next time it is actuated.

Following the severing of the web between succeeding panels by the break-up mechanism the forward panel, having entered between rolls 31, is driven by these rolls at a greatly increased speed, so as to separate this panel from the trailing panels and pass it quickly forward in the machine. The overriding drive serves also to press the panel forwardly during the break-up operation so as to take up any slack and make the web 174 taut between the panels. After the web 174 is severed the edges of the forward panel are held in line by the plates 40 on the ends of both rolls 32 and 31 so that the panel, being then freed from the succeeding panel, does not turn within the machine.

At its increased speed of movement the panel passes rapidly onto the strips 76L and 76R where its side edges are retained by the strips 76a and 76b.

When the leading edge 173 comes into contact with switches LS3 and LS4 this releases air pressure from the cylinders 79 permitting strips 76L and 76R to move downwardly about their pivots and allowing the forward panel to drop down onto the bed of the carriage. Actuation of switch LS4 operates also to cut off the overdrive motor 34 permitting rolls 31 to return to normal speed. Actuation of switches LS3 and LS4 serves also to cut off air pressure to cylinders 122a and 122b to allow the central support bar 120 to descend to the bed of the carriage.

Operation of switches LS3 and LS4 by the leading edge 173 of the panel also operates to actuate the cylinders 110L and 110R causing their pistons to be extended moving the presser bars 175L and 175R downwardly against the end portions of the panel to prevent any inaccuracy due to warping of the panel or due to falling improperly on the carriage bed.

When the panel drops to the bed of the carriage it operates switch LS6 which actuates the air cylinders 111 to press strips 113L and 113R against the ends of the panel to bring the ends to the proper position. At the same time LS6 operates to actuate the cylinders 78 to bring up the lip 75 so as to grip the panel at its sides between the back flange 96R1 and the lip 75 to make the panel exactly square and tight.

When the panel is pressed tightly against the back flanges 96R1 as above explained the side of the panel is brought into engagement with switches LS7 and LS8 the operation of which does the following:

a. Operates cylinders 79 to bring the support strips 76L and 76R back to their horizontal or supporting positions.

b. Operates cylinders 111 to remove lips 113L and 113R away from the ends of the panel.

c. Operates cylinders 110L and 110R to raise the presser bars 175L and 175R.

d. Starts the motor 66 which starts the carriage in lateral motion.

It may be observed that the panel remains bound at its side edges between the back flange 96R1 and the lip 75, the cylinders 78, which press lip 75 in binding position, remaining in activation at this time. Thus the panel remains held in its true squared condition while the carriage moves the panel laterally through the saws 102L and 102R. As the panel passes the saws its end edges are trimmed and as it passes beyond the saws the ends of the left side edges enter the channels 82L and 82R of the flipper mechanism When the carriage is approaching the end of its lateral travel it engages switch LS10 which serves to cut the speed of motor 66 and decelerate the speed of the carriage, and when the carriage comes into engagement with LS9 operates to:

a. Actuate cylinders 78 to move the lip 75 down to a horizontal position releasing the panel from its grip.

b. Actuate cylinder 95 to bring the gripper fingers 95ab through the slots in the channel members and into gripping relation with the panel, and c. Through time delay apparatus to reverse the motor 66 causing the carriage to start its return movement.

As the carriage returns it engages LS11 (FIG. 13) which affects motor 66 to decelerate the carriage, and also to actuate cylinders 92L and 92R to temporarily remove the lock which normally prevents turning of the flipper channels 82L and 82R. Switch LS11 also starts the motor 91 of the flipper mechanism which through chains 90L and 90R serve to rotate the channels 81L and 81R through 180° until the plungers 93L and 93R fall into the other notches 198L and 198R on the cams 94L and 94R. Thus, the panel has been turned over through operation of the flipper mechanism.

As the carriage returns completely to its retracted position it engages switch LS5 which cuts off the motor 66 and the carriage comes to a complete stop. LS5 also operates to actuate cylinders 92L and 92R to lock the flipper mechanism in its new position. LS5 also operates cylinders 95 to release the gripper fingers 95ab from the panel and bring them to their original retracted position.

When the flipper mechanism has completed its 180° cycle a cam lug located on chain 90R makes engagement with switch LS12 which operates to set the drive device 91 for movement in the opposite direction the next time it is actuated.

As previously explained the above operation applies when the plywood panels have a continuous top layer of resin-impregnated fiberglass, but the machine is applicable also to individual panels fed to the machine one after the other. In this case the break-up mechanism is not required and may be disconnected or left to run idly. If the panels are spaced as they are fed to the machine the break-up mechanism will operate to lower the knife between the panels without cutting anything, and if the panels are abutted as they are fed to the machine leaving no space between the ends of the panels the switch LS1-2 will not be operated and the break-up mechanism remains idle.

Switch LS11 may suitably be of the type which requires its lever arm to be pressed twice, instead of once, to cause it to actuate motor 91 of the flipper mechanism, and in such case every other panel will be turned over by this mechanism. This is convenient when it is desired to stack the panels fact to face and back to back.

The panels may be manually removed from the channels 81L and 81R after the locking mechanism has released them, or if not so removed, the following panel will push the forward panel from these channels into a stack close to the machine.

In the foregoing detailed description the side edges are first trimmed in a direction along the length of the panels, and the end edges are later trimmed along the width of the panels, and it might be presumed that the width always represents the shorter dimension of the panel and the length the longer dimension, but this is not necessarily the case. The machine may obviously be adjusted first to trim along the shorter dimension of the panel and later along the longer dimension of the panel. In this latter case the 23b may be cut between the longer dimension of the panel.

Sequential Logic of the Electrical, Hydraulic and Pneumatic Systems

Figure 30:
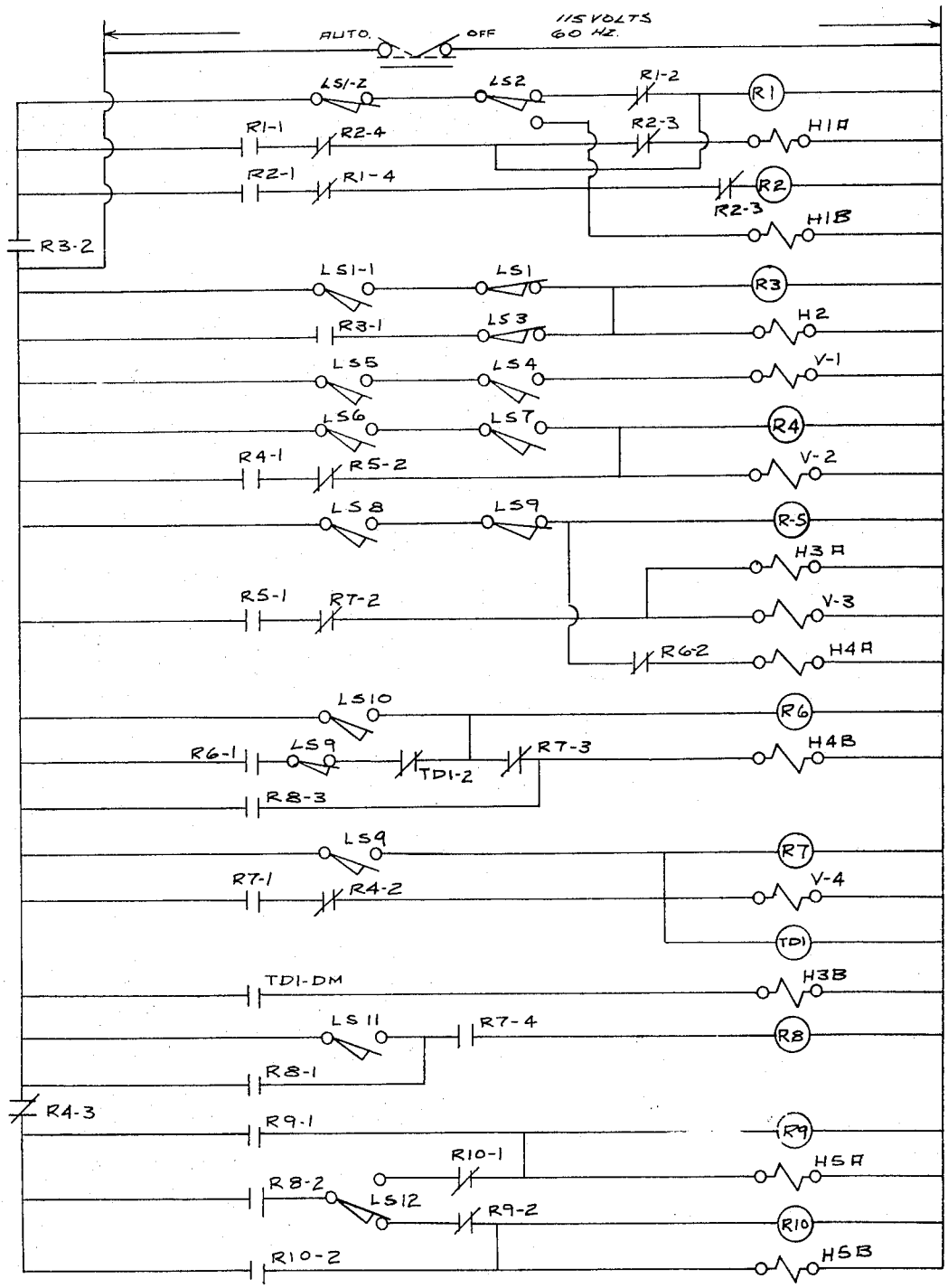
FIG. 30 is a circuit diagram showing schematically the switches and the devices they bring into operation.

The electrical circuits for the machine are illustrated particularly in FIG. 30, and the following description will be understood with reference to the diagram given in FIG. 30. It is understood that the switches referred to in this description may be selected in accordance with engineering practice to open or close circuits to actuate other equipment as described, and such switches may be mounted on frame members or structures of the machine as may be convenient to perform the functions outlined.

As the panel 171 is received from the forming m machine the leading edge 173 of the panel passes through feed rolls 33. The panel sides then come into contact with saws 19L and 19R which cut the side edges. The leading edge 173 then comes into engagement with switches LS1 and LS1-1 in sequence which turns on the hydraulic motor 34. Switch LS1 is opened by the leading edge 173 of the panel while switch LS1-1 is closed by the leading edge 173 of the panel. This condition remains as long as the panel 171 continues passing over switches LS1 and LS1-1 or until actuated by the trailing edge 172 of the panel. The leading edge 173 depresses switch LS1-2 opening its electrical circuit, and remains in this condition as the panel 171 continues passing over LS1-2.

As the trailing edge 172 sequentially passes over switches LS1 contacts close and provide an instant circuit through LS1-1 (due to LS1-1 being behind LS1) causing relay R3 to be energized and held in this condition by holding circuit contacts of relay R3-1. Simultaneously, solenoid H2 of the high speed rolls is energized, shifting hydraulic valve 200 causing pressure flow through hydraulic motor 34, rotating high speed shafts 31 and 31a. With relay R3 energized, contacts R3-2 close allowing an electrical circuit to be made up to LS1-2. As the trailing edge 172 releases LS1-2 contact closure completes the circuit through LS2 (depending on its position) to energize relay R1 or R2. R1 is energized through the normally closed contacts of R1-2 and held energized through holding circuit R1-1 through normally closed contact of relay R2-4, also opening contact R1-3 to relay R2 to keep it immobilized during the complete cycle. Simultaneously, solenoid H1A of the hydraulic break-up mechanism is shifted to allow pressure to be delivered to the break-up drive motor 24 causing shafts 59L and 59R to rotate, driving gear 26 and gear 25, causing the synchronous closure of the knife carrier 21 with knives 27 and anvil bar carrier 53 through a 180° cycle, causing the web to be severed at 90°. Completion of the 180° cycle causes LS2 to reposition for the next cycle in the opposite direction.

The leading edge 173 continues onto the panel drop 76R and 76L until engagement by the leading edge 173 with switches LS3 and LS4. LS3 and LS4 are adjustable for the length of 76R so as to accommodate various lengths of panel 171.

By the depression of switches LS3 and LS4 the following events occur: LS3 opens circuit to relay R3 to de-energize this relay causing hydraulic motor 34 to revert back to conveyor speed. The clutch contact of relay R3-2 is opened de-energizing the electrical circuit to the break-up mechanism B. Simultaneously LS4 performs several functions when depressed by the leading edge 173 of panel 171. Contact closure of LS4 completes electrical circuit to V-1 shifting the air valve to allow the cylinders 79 to be retracted thus opening panel drop 75L and 76R, allowing the panel 171 to drop onto the carriage. Closure of LS4 also serves to energize the solenoid of air valve V-1 shafting the valve ports so as to retract cylinders 122a and 122b of the panel support located on the carriage. Also the same contact closure energizes the solenoid of the air valve controlling cylinders 110L and 110R to seat panel 171 onto the carriage. The air valve of the presser cylinders 110L and 110R will be required to be energized to retract as will be explained in connection with the squaring operation. As the panel 171 clears switches LS3 and LS4 these switches return to their normal position closing panel drop 76R and 76L by de-energizing solenoid to air valves for the panel drop cylinders 79.

The following sequence will occur while the panel 171 is on the carriage:

As the presser bars 175L and 175R are extending and prelocating the panel 171 onto the carriage, switch LS6, located on the carriage, is depressed, making electrical contact up to switch LS7. Switch LS6 is required in the sequence to provide an electrical means for sensing when a panel 171 is on the carriage. Simultaneously solenoid of air valve V-2 is energized, causing the operation or cylinders 78 to bring up the lip 75 so as to grip the panel 171 at its sides between the back flange 96R1 and the lip 75, to make the panel 171 exactly square and tight. As the panel 171 depresses switch LS7 completing the electrical circuit to energize relay R4 and closing contacts R4-1 of relay R4 this completes the holding circuit through the normally closed contact of R5-2. Lip 75 remains in this position and is released upon the completion of the sawing operation. Simultaneously the cylinders of the presser bars are actuated, to bring lips 113L and 113R against the ends of the panel for proper position and the switch LS8, located on press bar strip 113L, is depressed, completing the electrical circuit through LS9, energizing relay R5, closing the holding circuit contacts R5-1 through contact R7-2, causing hydraulic valve H3A to shift to forward and hydraulic valve H4A to shift to rapid speed. Through contact R6-2 carriage starts forward movement due to hydraulic motor 66 being pressurized for sawing operation. Simultaneously cylinders 110L and 110R retract to normal position.

Switch LS13 is located on the forward end of the panel drop 76R. Its function is that of retracting the pusher bar cylinders 110L and 110R which are extended during the squaring and seating of the previous panel. The succeeding leading edge 173 will engage switch LS13 completing the electrical circuit and energizing the solenoid of the air valve to retract the cylinders 110L and 110R and hold them in this position until the trailing edge 172 of the panel releases switch LS13. This function prevents jambing of the machine by the following panel being stopped by the extended presser bar guide shaft 112aL and 112bL if the preceding panel does not complete the previously described movement of the panel into saws 102L and 102R in the normal time available.

The carriage, when panel 171 is locked into position, passes the panel through saws 102L and 102R for the final end trim. After the carriage, with panel 171 secured thereto, completes the sawing operation, the carriage frame member 71R engages switch LS10 to energize relay R6, of which contact R6-2 opens de-energizing the solenoid of hydraulic valve H4A and energizing the solenoid of hydraulic valve H4B to decelerate the carriage. As the carriage engages switch LS9, electrical circuit is opened to hydraulic valve H4B stopping the carriage and releasing air pressure from lip 75 allowing the panel to be released from the locking grip required for squaring and sawing.

At this instant relay TD1 adds time delay to allow for the clamping cylinders 95 to bring gripper fingers 95a and 95b onto panel 171 thus locking the panel in place by energizing the solenoid of air valve V-4 by means of holding circuit contacts R7-1. After time delay relay TD1 completes its delay, contacts TD1 close energizing solenoid hydraulic valve H3B causing the carriage to reverse through hydraulic motor 66. As the carriage returns it engages LS11 which affects motor 66 to decelerate the carriage and also to actuate cylinders 92L and 92R through energizing solenoid air valve controlling cylinders 92 to temporarily remove the lock which normally prevents the rotation of the flipper channels 82L and 82R. Simultaneously, relay R8 energizes and is held through holding contacts R8-1 allowing the electrical circuit to be completed to the flipper drive through normally closed contacts R4-3, and depending on the position of switch LS12, to energize the relay R10 through contacts R9-2 causing hydraulic motor 91 to rotate and to turn the flipper device over; and LS12 will engage cam on chain 90R so that the next cycle will produce rotation in reverse direction.

As the carriage engages switch LS5 the solenoid for the air valve controlling cylinders 92 de-energizes locking flipper channels 82L and 82R and de-energizing clamping cylinders 95 to retract and release the grip on panel 171. At this point all electrical circuits reset for the next operational cycle.

It will be understood that although a particular embodiment of the invention has been described in detail herein, many other embodiments may be provided and many changes and alterations may be made in line with the spirit of this disclosure and the skill of the art without departing from this invention.

We claim:

1. In a machine for trimming the edges of panels, a carriage on which the panel to be trimmed may be received, means for engaging the opposing edges of said panel to square the panel with the carriage, a pair of saws mounted within said machine and spaced apart a distance equal to the intended dimension of said panel, means for pressing said panel against said carriage to flatten the panel against the carriage, said means including a pressure bar which is pressed against the panel, means mounted on said pressure bar for positioning the other opposing edges of the panel, and means for moving said carriage past said saws to thereby trim the other opposing edges of the panel.

2. A machine as set forth in claim 1 wherein said means for pressing is mounted in the frame of the machine and wherein said carriage is movable with respect to said frame.

3. A machine as set forth in claim 2 including means for raising said pressure bar to free it from contact with said panel prior to the operation of said means for moving said carriage.

4. In a machine for trimming the edges of panels, a carriage which is reciprocately movable and which provides a bed on which a panel may be received flat side down with its end edges parallel with the direction of movement of the carriage, a pair of saws mounted within said machine and spaced apart a distance equal to the intended length of said panel, an elongated backing member extending transversely of said carriage at a 90° angle with the direction of movement of said carriage for engaging one side edge of said panel, means engaging the other side edge of said panel to press said one edge against said backing member to grip said panel between said backing member and said means, and means for moving said carriage past said saws while the panel is thus gripped to thereby trim the end edges of the panel.

5. A machine as set forth in claim 4 wherein said engaging means includes a lip member pivotally mounted in said carriage and movable about its pivot into engagement with said other side edge of the panel.

6. A machine as set forth in claim 5 including a fluid cylinder for moving said member about its pivot to bring it into engagement with said other side edge.

7. A machine as set forth in claim 6 including switch means for actuating said cylinder when said panel comes into place on the bed of said carriage.

8. A machine as set forth in claim 4 including switch means operable when said carriage has moved to a predetermined position where a panel carried thereon is past said saws for releasing said engaging means to free said panel from the grip of said backing member and engaging means.

9. A machine as set forth in claim 4 including trimming means for trimming said one side edge of the panel to make said one edge straight before said panel is pressed against said backing member by said engaging means.

10. A machine as set forth in claim 9 wherein said trimming means includes a saw and conveying means for passing said panel past said saws and onto the bed of said carriage.

* * * * *